June 5, 1934.                  E. VION                    1,961,312
    MAGNETIC COMPASS FOR AVIATION, NAVIGATION, AND OTHER PURPOSES
                       Filed July 25, 1927        4 Sheets-Sheet 1

Inventor
Eugène Vion
by Connolly Bro
        Att'ys

June 5, 1934. E. VION 1,961,312
MAGNETIC COMPASS FOR AVIATION, NAVIGATION, AND OTHER PURPOSES
Filed July 25, 1927 4 Sheets-Sheet 2

Inventor.
Eugène Vion
by Connolly Bros
Atty's

June 5, 1934.  E. VION  1,961,312
MAGNETIC COMPASS FOR AVIATION, NAVIGATION, AND OTHER PURPOSES
Filed July 25, 1927  4 Sheets-Sheet 4

Inventor
Eugène Vion.
by Connolly Bros
Attys

Patented June 5, 1934

1,961,312

UNITED STATES PATENT OFFICE 1,961,312

MAGNETIC COMPASS FOR AVIATION, NAVIGATION, AND OTHER PURPOSES

Eugène Vion, Paris, France

Application July 25, 1927, Serial No. 208,288
In France June 18, 1927

2 Claims. (Cl. 33—223)

The present invention relates to magnetic compasses for aviation, navigation, and other purposes. The compasses at present in use for navigation and kindred purposes render it possible to read off the courses or angles of route either above the rose only, or below the rose only, or either above or below the rose as desired, or on the cylindrical surface of a rose of cylindrical form, or either on the cylindrical surface of or above a rose of this latter kind, as desired.

Now, in certain cases, it is desirable to be able to mount the compass above the horizontal plane which passes through the eye of the pilot, for instance, by attaching it to the upper wing of an aeroplane—if suitable space is available in the body of the wing.

It may in fact happen—for instance, in small aircraft or in scouting aeroplanes—that it is not conveniently possible to mount the compass in the keelson owing to the latter having too little space or being too much encumbered with other instruments or parts.

The compasses in use at the present time do not readily lend themselves to the first-named method of employment.

The observation of the compass reading from above is either impossible in these circumstances or else necessitates the use of reflectors which have to be located at a distance from the compass, thus involving a relatively considerable extra expenditure of space if the reflector is fixed to the compass, or, alternately involving an inconvenient manipulation for mass manufacture if the reflector is independent of the compass.

The observation of the compass reading from the side only is inconvenient if the compass is arranged close to the vertical line passing through the pilot.

On the other hand, the reading of the compass from underneath may prove very inconvenient if the compass is located at a distance from the said vertical line.

It is one of the principal objects of the present invention to eliminate these drawbacks by means of a device which renders it possible to read the compass simultaneously from the side and from the bottom of the rose, the compass being adapted for use independently of whether it is mounted near to or far away from the vertical line passing through the pilot.

With this object in view, the compass according to the invention comprises an annular rose constructed of material having a cross-section similar to that of angle iron pivotally mounted in a receptacle having its side and bottom walls transparent, and permitting of the simultaneous reading of a first scale provided on the exterior of the vertical side wall, and of a second scale provided on the horizontal under surface of the said rose, this latter reading being preferably rendered more convenient by the aid of a reflector or magnifying prism attached to the compass.

The said compass is mounted through the medium of rubber buffer members or other equivalent members to a ring member fixed to the wing of an aeroplane or to any other suitable part of the craft in question, the compensating devices for deviations being mounted above the compass, in order to leave the lower part of the latter exposed to view.

In combination with the said novel arrangement the invention comprises other characterizing features which will be hereinafter described.

A preferred constructional form according to the invention is illustrated by way of example in the accompanying drawings, in which.

Figure 1:
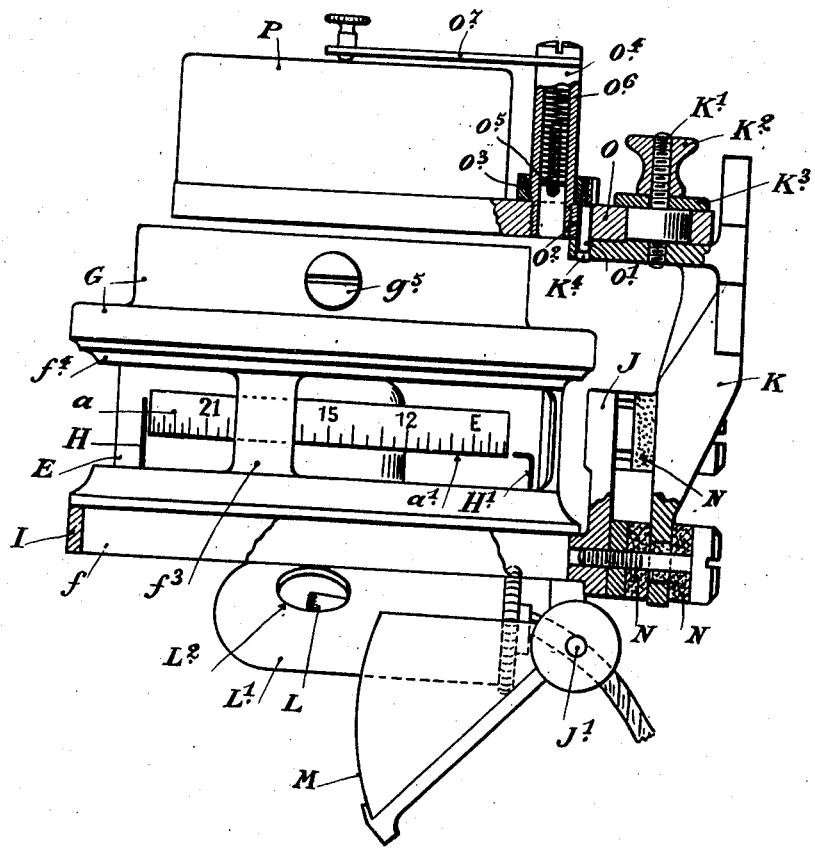
Figs. 1 and 2 show a complete compass according to the invention in side elevation and front elevation, partly in section, respectively.

In the example shown in the drawings the compass is of the liquid type, but it will be readily understood that the characteristic features of the invention may likewise be applied to a compass of the so-called "dry" type.

According to the invention the compass shown in the drawings comprises an anular rose (A—$A^1$) constructed of material having a cross-section similar to that of angle-iron, the vertical surface A of which rose is of cylindrical or truncated conical form and is provided with a first scale ($a$)— which may, for example, be graduated in degrees—which is visible laterally.

The horizontal surface of said annular rose forms a flat or slightly conical ring (A'), on the under side of which a second scale ($a^1$)—which may also be in degrees—is provided, said second scale being visible from below.

The rose is fixed for instance by means of small brackets ($a^2$) soldered, brazed or welded onto it, on the float (B) which itself rests with its pivot ($b$) on the bearing (C), which latter is fixed on a support (d), which is integral with the ring (F) constituting part of the cage as well as part of the bowl. The float (B) also has fixed to it at suitable places, the magnet (B') serving to control the position of the rose under the action of the earth's magnetic field.

The compass comprises a receptacle constituting a bowl and a cage for said bowl to contain eventually a liquid. This bowl is constituted of a horizontal bottom part (D) and a cylindrical, vertical wall or partition (E), both of transparent material such as glass, and which are mounted in an open walled structure; that is to say, that the bowl is composed of two parts united by mountings. The cage of the bowl which in the example illustrated is made an integral part with the latter, comprises also a lower ring or annulus $f$, on which is fixed the support (d), and which supports the transparent bottom (D) which is held up against it by means of ring ($f^1$) acting on a packing ($f^2$) of rubber or other material suitable for making a water-tight joint.

The lower ring ($f$) which constitutes a part of the bowl as well as part of the cage, is attached by means of standards ($f^3$) to an upper ring ($f^4$) on to which the cover (G) of the bowl is fitted and which is also a part of the bowl as well as part of the cage.

The side wall (E) of the bowl consists of a transparent cylindrical glass which is pressed at its lower rim up against the lower ring ($f$), by means of the cover (G) which, itself, presses upon the upper rim of the said cylindrical glass (E).

Water-tightness is assured by means of packed joints ($e, e^1$) of rubber, or other suitable material. The necessary pressure may be obtained, for example, by means of screws (g) which serve to bring the cover closer to or further away from the upper ring ($f^4$).

Figure 2:
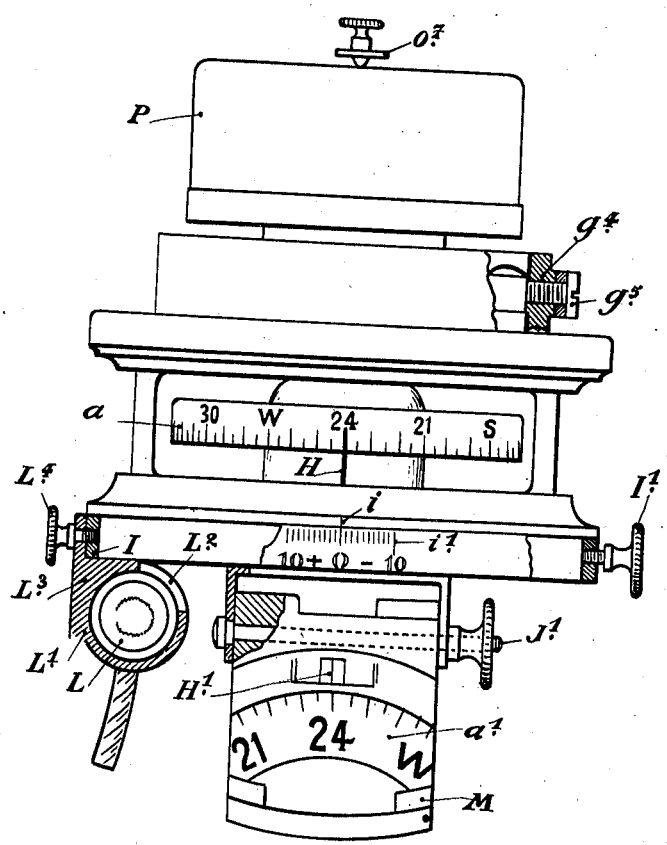

The cover consists of a cylindrical chamber, the bottom ($g^1$) of which is domed upwards and is provided near the centre with holes ($g^2$) which put the chamber into communication with the bowl. The top ($g^3$) of the chamber may consist of a flexible metallic wall which is undulated or corrugated in such a manner as to allow of variations of the volume of the liquid contained in the receptacle and in the chamber. The side wall of the said chamber is provided with a filling hole ($g^4$, Fig. 2) which is normally closed by a plug ($g^5$).

If bubbles of air are formed in the liquid in the bowl, they will rise towards the centre of the bottom ($g^1$) of the chamber (G) and will pass into the latter through the holes ($g^2$). They cannot return into the bowl, so long as they are not too voluminous, even if the apparatus is turned upside down, since they will collect in the acute angle formed by the bottom $g^1$ and the side wall of the chamber. The chamber (G) thus plays the part of an automatic trap for the air bubbles. In order that the bubbles should not become too voluminous, they are removed periodically by replacing them with liquid and, for this purpose the apparatus is rested on its side in such a manner that the filling hole is at the uppermost point of the chamber where the bubbles will collect.

The bottom ($g^1$) which separates the chamber (G) from the receptacle whilst permitting of communication between the chamber and the receptacle, likewise serves as a stop to limit the movements of the pivot (b) of the rose A—$A^1$—B.

It is, of course, intended to be understood that without departing in any way whatever from the principle of the present invention, the volume of the float could be made such that the upward pressure of the liquid is greater than the weight of the movable part. In these circumstances the pivot (b) would be upwardly directed. The bearing (C) might be fixed, for example, on the bottom ($g^1$) of the chamber (G), the upward movements of the pivot being in this case limited by the lower glass (D). Similarly the bearing C may be fixed to the float instead of the pivot.

On the lower ring ($f$) are fixed a front pointer (H) behind which the scale (a) carried by the cylindrical part (A) of the rose moves, and a back pointer ($H^1$) before which the scale ($a^1$) carried by the flat part ($A^1$) of the rose moves. These two pointers are adjusted and the scales are arranged in such a manner that the angles indicated by each pointer on the corresponding scale are always equal in all positions of the float with regard to the receptacle.

The lower ring ($f$) is inserted in a circular supporting member (I) in which it can be rotated, a screw ($I^1$) being provided to enable it to be fixed immovably in a definite position. The said ring is provided with a hair line ($i$, Fig. 2) which moves with the receptacle in front of a scale ($i^1$) provided on the circular supporting member (I), which scale may, for example, be in degrees and which renders it possible to adjust the position of the ring and consequently of the pointers (H) and ($H^1$) with regard to the circular member (I) and thus to regulate conveniently the fiducial line indicated by the said indexes with regard to the axis of the air craft, the said circular member (I) being rigidly attached to the latter by means of an arm (J) and a supporting member (K) for this arm.

The circular member (I) may serve for the attachment of a movable illuminating device consisting, for example, of a lamp (L) arranged in a tube ($L^1$) closed at the front and having a lateral opening ($L^2$) which permits of the illumination of the two scales and of the two indexes at their operative part, the said tube ($L^1$) being fixed on a vertical arm ($L^3$) abutting on the one hand on the lower edge of the circular member (I) and resting on the other hand on the side surface of the said member to which it is secured by means of a milled nut ($L^4$).

The arm (J) which is integral with the circular member (I) carries a horizontal axle ($J^1$) around which a magnifying total reflection prism (M) or any other suitable magnifying or reflecting, or magnifying and reflecting device is adapted to rotate.

The arm (J) is fixed to the supporting member (K) for the compass with the aid of intermediary buffers of rubber or suitable equivalent members.

Figure 3:
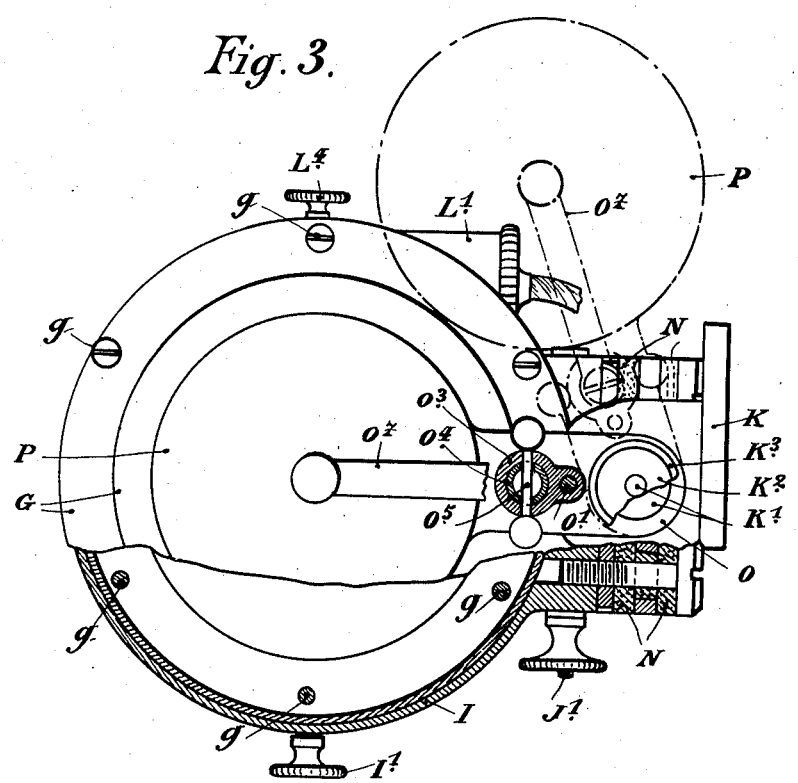
Fig. 3 is a plan of the compass partly in section.

The supporting member (K) is provided with holes which render it possible to fix it, for example, in the body of the wing of an aeroplane, or on any other suitable fixed part and is adapted to serve to carry the compensating devices for the deviations to which the compass may be subjected. The said compensating devices, which are protected by the case (P) can be put out of action with a view to facilitating the raising of the receptacle and cage from the circular supporting member (I) and may be subsequently thrown into action again and fixed immovably in their working position. For this purpose, by way of example, the said supporting member may be provided with an axle ($K^1$) around which the platform (O) carrying the compensating devices of known type arranged in the case (P) is adapted to turn. A milled nut (K²) together with a washer (K³) serve to fix the said platform (O) in any desired operative position, and in particular in the position to which it is automatically adjusted by means of a pin (O¹) sliding in a recess (O²) formed in the said platform (O) and coming into engagement with a recess (K⁴) provided in the supporting member (K). The said pin (O¹) is in one piece with a slide member (O³) movable on a standard (O⁴), the slide member and the standard being both traversed by a rounded pin (O⁵) serving for the manipulation of the pin (O¹) in order to disengage the latter from the recess (K⁴) before putting the compensating devices out of action by swinging them on one side, as shown in Fig. 3, for the purpose of removing the receptacle and cage from the circular member,—for example in order to test the compass or to re-fill the receptacle in the manner described above. A spring (O⁶) urges the pin constantly downwards and causes it to enter the said recess (O²) as soon as the said pin is above the latter, the compensating devices being then in their operative position. The said spring (O⁶) is arranged in the hollow standard (O⁴) which likewise serves as a pivot for a flat spring (O⁷) which holds in place the case (P) containing the compensating devices.

Figure 6:
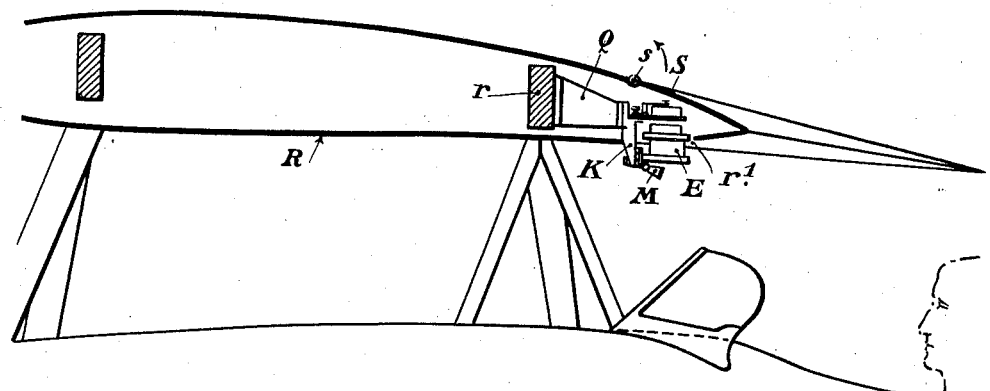
Fig. 6 is a diagram indicating the method of arranging the new compass in the body of an aeroplane wing.
Figure 4:
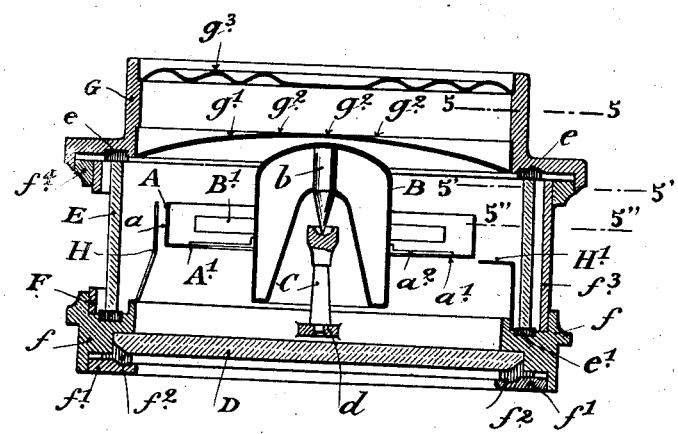
Fig. 4 is a sectional elevation of the rose receptacle and of the rose within it.
Figure 5:
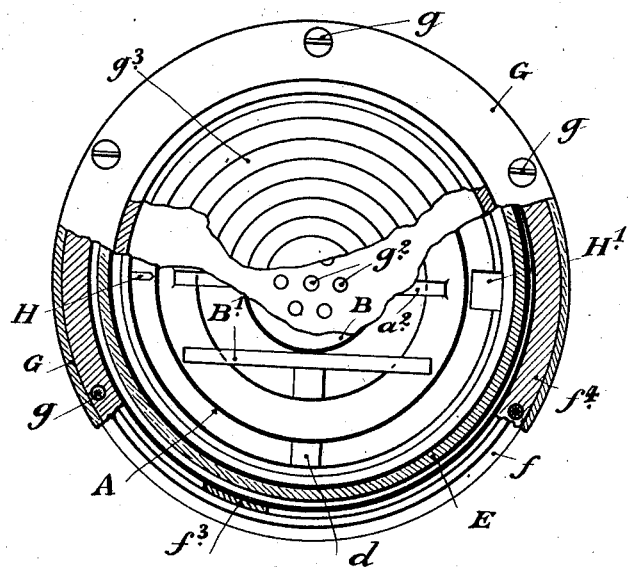
Fig. 5 is a plan corresponding to Fig. 4, partly in section on lines 5—5, 5'—5' and 5''—5'' of Fig. 4.

By way of example the drawings show in Fig. 6 a method of attaching the compass to a bracket (Q) which is itself fixed on the rear support (r) of a wing (R) of an aeroplane. An opening (r¹) is provided in the lower wall of the wing above the keelson in order to mount the compass in the body of the wing with a view to diminishing the resistance to forward motion whilst leaving the scales on the rose visible.

On the upper part of the wing a trap-door (S) which can be flapped back by rotation about a hinge (s) is provided, said trap-door giving access to the compensating devices and rendering it possible, when necessary to dismount the receptacle from the circular supporting member.

I claim:

1. In a magnetic compass comprising a rose having a horizontal downwardly facing graduated scale to permit reading of the scale from a point below the compass, a bowl in which said rose is pivotally mounted, including transparent side and bottom walls, a circular member on which said rose is mounted for rotation about a normally vertical axis, a laterally disposed arm connected with said member and means for attaching said arm to the upper part of the body of an aeroplane.

2. A magnetic compass comprising a rose having a graduated horizontal scale visible from a point below the same and a receptacle having a transparent bottom constituting a combined bowl and cage in which said rose is mounted, a cylindrical chamber constituting a cover for said receptacle and comprising an upwardly concave dome-shaped member forming a bottom for said chamber, provided with holes communicating with the inner part of said receptacle and a flexible corrugated diaphragm forming the top of said chamber, said cover having a filling hole for the chamber and receptacle.

EUGÈNE VION.